(12) United States Patent
Lodha

(10) Patent No.: US 7,383,349 B2
(45) Date of Patent: Jun. 3, 2008

(54) CONTROLLING THE FLOW OF PACKETS WITHIN A NETWORK NODE UTILIZING RANDOM EARLY DETECTION

(75) Inventor: Sandeep Lodha, Sunnyvale, CA (US)

(73) Assignee: Lucent Technologies Inc., Murray Hill, NJ (US)

(*) Notice: Subject to any disclaimer, the term of this patent is extended or adjusted under 35 U.S.C. 154(b) by 902 days.

(21) Appl. No.: 10/199,238

(22) Filed: Jul. 19, 2002

(65) Prior Publication Data
US 2003/0225903 A1 Dec. 4, 2003

Related U.S. Application Data

(60) Provisional application No. 60/386,001, filed on Jun. 4, 2002.

(51) Int. Cl.
*G06F 15/16* (2006.01)
(52) U.S. Cl. ............ 709/232; 709/229; 709/234; 709/235; 370/232; 370/234; 370/235; 370/412
(58) Field of Classification Search ............ 709/232, 709/235, 229; 370/232, 234, 235, 236, 396
See application file for complete search history.

(56) References Cited

U.S. PATENT DOCUMENTS 6,788,697 B1 * 9/2004 Aweya et al. ............... 370/412
6,865,185 B1 * 3/2005 Patel et al. ................. 370/412
6,904,015 B1 * 6/2005 Chen et al. ................. 370/235
6,977,930 B1 * 12/2005 Epps et al. ................. 370/392
7,006,437 B2 * 2/2006 Ogier et al. .............. 370/230.1
7,046,680 B1 * 5/2006 McDysan et al. ........... 370/396

FOREIGN PATENT DOCUMENTS

WO WO 02/07381 A2 1/2002

OTHER PUBLICATIONS

Sally Floyd and Van Jacobson, Random Early Detection Gateways for Congestion Avoidance, Aug. 1993, 30 pages, Berkeley.

* cited by examiner

*Primary Examiner*—Yves Dalencourt

(57) ABSTRACT

A method and system for controlling the flow of packets within a network node is disclosed. The method comprises receiving packets that are intended for a queue, classifying each of packets into at least one of a plurality of traffic classes and applying class-specific random early detection to each of said packets. The system comprises a classification engine configured to classify packets into one of a plurality of traffic classes, class-specific random early detection (RED) logic configured to apply class-specific RED to each of said packets that have been classified by said classification engine; and a queue for queuing any of said packets that are not dropped in response to application of said class-specific RED.

26 Claims, 8 Drawing Sheets

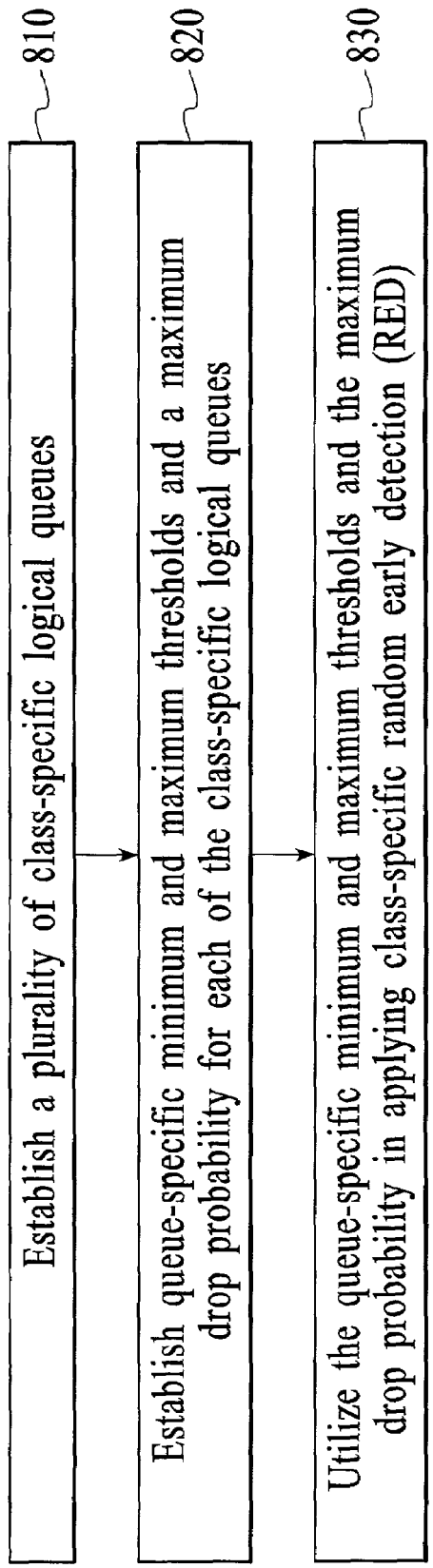

810 — Establish a plurality of class-specific logical queues

820 — Establish queue-specific minimum and maximum thresholds and a maximum drop probability for each of the class-specific logical queues 830 — Utilize the queue-specific minimum and maximum thresholds and the maximum drop probability in applying class-specific random early detection (RED)

FIG. 8

Class-specific drop probability weight table

| Class A | $wt_A$ |
|---------|--------|
| Class B | $wt_B$ |
| Class C | $wt_C$ |

CONTROLLING THE FLOW OF PACKETS WITHIN A NETWORK NODE UTILIZING RANDOM EARLY DETECTION

CROSS-REFERENCE TO RELATED APPLICATION

This application is entitled to the benefit of provisional U.S. Patent Application Ser. No. 60/386,001, filed Jun. 4, 2002.

FIELD OF THE INVENTION

The present invention relates generally to computer networks, and specifically to a method and system for controlling the flow of packets within a network node utilizing random early detection.

BACKGROUND OF THE INVENTION

Communications networks (LANs, WANs, etc.) currently transfer vast quantities of information in both local and wide area networks. The information typically consists of signals (electronic or optical) representing digitized or digital voice, video, and/or data that is transferred between endpoints in networks. For information to be transmitted in a network, a communication path must be established within the network between the sender(s) and receiver(s) of the information. In an Internet Protocol (IP) environment, Transmission Control Protocol (TCP) is used at the transport layer, where the layers of the network are defined by the International Standards Organization (ISO) in the Open System Interconnection (OSI) model. TCP is reliable, full-duplex and streaming. To achieve this functionality, the TCP drivers break up a session data stream into discrete packets and attach a TCP header to each packet. An IP header is also attached to the packet and the composite packet is then passed to the network for delivery.

Once the packets are passed to the network, routers (also referred to as network nodes) route the data packets to their various destinations. A router is a network node that forwards data packets within a network as well as from one network to another. Routers read the network address in each transmitted packet and use routing tables and routing protocols to make decisions on where to forward each packet.

FIG. 1 depicts an example of a packet-switching network 100 in which a router 110 connects multiple client computers 101-106. As packets come in and out of the router 110, the router 110 queues the packets for delivery to their destination. In high-speed networks, router queues have a tendency to become congested with packets. When a queue overflows, packets are dropped (typically a tail drop) from several TCP sessions, and the several TCP sessions back-off (i.e., decrease the transmission window) at the same time. This synchronized back-off can cause underutilization at the router.

A conventional technique for handling packet congestion, which addressed the problem of synchronized back-off involves the utilization of Random Early Detection (RED) algorithms. RED algorithms involve detecting congestion within a gateway router and causing TCP sessions to back-off in an unsynchronized manner. Implementing RED involves computing the average queue size of a queue within the router. When the average queue size of the queue is within certain bounds, the router probabilistically drops each arriving packet (i.e., according to a certain drop probability), wherein the drop probability is a function of the average queue size. RED is discussed at length in the following publication, which is incorporated by reference herein: Sally Floyd et al., "Random Early Detection Gateways for Congestion Avoidance" August 1993 IEEE/ACM Transactions on Networking.

FIG. 2 depicts a conventional queue 202. As the number of queued packets increases, the average size of the queue ($Q_{ave}$) increases. The maximum threshold ($max_{th}$) 204 is a preset threshold wherein if $Q_{ave} > max_{th}$, then all incoming packets are dropped. The minimum threshold ($min_{th}$) 206 is a preset threshold wherein if $Q_{ave} < min_{th}$, then all incoming packets are queued for forwarding to their respective destinations. In the case where, $$min_{th} < Q_{ave} < max_{th},$$

a drop probability ($P_d$) is calculated for each incoming packet and packets are dropped (probabilistically) based on the calculated $P_d$ (e.g., a packet with a higher $P_d$ is more likely to be dropped than a packet with a lower $P_d$).

In today's networking environment, a plurality of different classes of data traffic are simultaneously transmitted within the same network. For example, different traffic classes may include voice data, streaming audio/video data, web browsing/email data, etc. FIG. 3 depicts a single queue 300 that is utilized to queue different classes of traffic (i.e., class A, class B, and class C traffic). In the example, class A traffic may include voice data, class B traffic may include streaming audio/video, and class C traffic may include web browsing/email data.

In many situations, a particular traffic class may have a higher priority than another traffic class. For example, if voice data is being transmitted (i.e., a phone conversation is being conducted via a network), the transmission of the voice data should have a higher priority than the transmission of a text document. This is due to the fact that the voice data transmission is delay-sensitive, whereas the transmission of the text document is not delay-sensitive and could be transmitted in a more sporadic fashion. However, utilizing the above-described RED scheme to manage traffic congestion, $P_d$ is calculated in the same fashion for all incoming traffic irrespective of traffic class (assuming the traffic from classes A, B, and C is intended for the same queue). That is, the same RED algorithm is used to manage the class A, B, and C traffic and the $P_d$ calculation is made irrespective of the traffic class. Consequently, all of the packets intended for the queue are handled in the same manner regardless of the packet's traffic class. Utilizing the phone conversation example, if voice data (i.e., class A traffic) is being transmitted at the same time as a text document (i.e., class C traffic) and if the queue is congested, then the likelihood of dropping the respective voice packets (i.e., the class A traffic) is the same as the likelihood of dropping the respective text packets (i.e., the class C traffic). Because the voice packets are given no preference over the text packets, the voice data could be transmitted in a choppy fashion, thereby resulting in a poor quality of service (QoS).

Therefore, what is needed is a method and system for controlling the flow of traffic within a network node utilizing RED that addresses the above-described shortcomings of the conventional methodology. The method and system should be simple, cost effective and capable of being easily adapted into existing technology.

SUMMARY OF THE INVENTION

A method and system for controlling the flow of packets within a network node involves the classification of the packets into a plurality of different traffic classes and the implementation of a class-specific packet-drop scheme on a per-queue basis, wherein the class-specific packet-drop scheme is based on a relative priority of the different traffic classes. By implementing a class-specific packet-drop scheme, packets that are intended for a particular queue are dropped based on a relative priority of the different traffic classes such that lower priority packets that are intended for the queue are more likely to be dropped than higher priority packets that are intended for the same queue during times of congestion.

A first embodiment of the invention includes a method for controlling the flow of packets within a network node. The method comprises receiving packets that are intended for a queue, classifying each of the packets into at least one of a plurality of traffic classes, and applying class-specific random early detection (RED) to each of the packets.

In an embodiment of the method, applying class-specific RED includes establishing a plurality of class-specific logical queues for queuing the packets, establishing queue-specific minimum and maximum thresholds and a maximum drop probability for each of the class-specific logical queues, and utilizing the queue-specific minimum and maximum thresholds and the maximum drop probability that are established for the class-specific logical queues in applying class-specific RED.

In another embodiment of the method, applying class-specific RED includes establishing class-specific drop probability weights for each of the plurality of traffic classes. In a further embodiment, applying class-specific RED includes identifying a corresponding class-specific drop probability weight for one of the received packets and utilizing the corresponding class-specific drop probability weight to calculate a class-specific drop probability for the one received packet. In a further embodiment, the class-specific drop probability weights represent the relative priorities of the traffic classes.

Another embodiment of the invention includes a system for controlling the flow of packets within a network node. The system comprises a classification engine configured to classify packets into one of a plurality of traffic classes, class-specific RED logic configured to apply class-specific RED to each of the packets that have been classified by the classification engine, and a queue for queuing any of the packets that are not dropped in response to application of the class-specific RED.

In an embodiment of the system, the class-specific RED logic includes logic for establishing a plurality of class-specific logical queues for queuing the packets, for establishing queue-specific minimum and maximum thresholds and a maximum drop probability for each of the class-specific logical queues, and for utilizing the queue-specific minimum and maximum thresholds and the maximum drop probability that are established for the class-specific logical queues in applying class-specific RED.

In another embodiment of the system, the class-specific RED logic includes logic for maintaining class-specific drop probability weights for each of the plurality of traffic classes. In a further embodiment, the class-specific RED logic includes logic for identifying a corresponding class-specific drop probability weight for one of the received packets and for utilizing the corresponding class-specific drop probability weight to calculate a class-specific drop probability for the one received packet. In a further embodiment, the class-specific drop probability weights represent the relative priorities of the traffic classes.

Other aspects and advantages of the present invention will become apparent from the following detailed description, taken in conjunction with the accompanying drawings, illustrating by way of example the principles of the invention.

BRIEF DESCRIPTION OF THE INVENTION

FIG. 8 is a flowchart of an embodiment of the method for controlling the flow of traffic within a network node in accordance with an embodiment of the invention.

FIG. 9 depicts a class-specific drop probability weight table for implementing another embodiment of the method for controlling the flow of traffic within a network node in accordance with an embodiment of the invention.

DETAILED DESCRIPTION

The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Within the Internet, internal and external networks are linked by network nodes, such as routers that route data packets from a sending network to another router or a receiving network.

The disclosed method and system for controlling the flow of packets within a network node, such as a switch or a router, involves the classification of the packets into a plurality of different traffic classes and the implementation of a class-specific packet-drop scheme of a per-queue basis, wherein the class-specific packet-drop scheme is based on a relative priority of the different traffic classes. By implementing a class-specific packet-drop scheme, packets that are intended for the same queue are dropped based on a relative priority of the different traffic classes such that lower priority packets are more likely to be dropped than higher priority packets during times of congestion.

Figure 1:
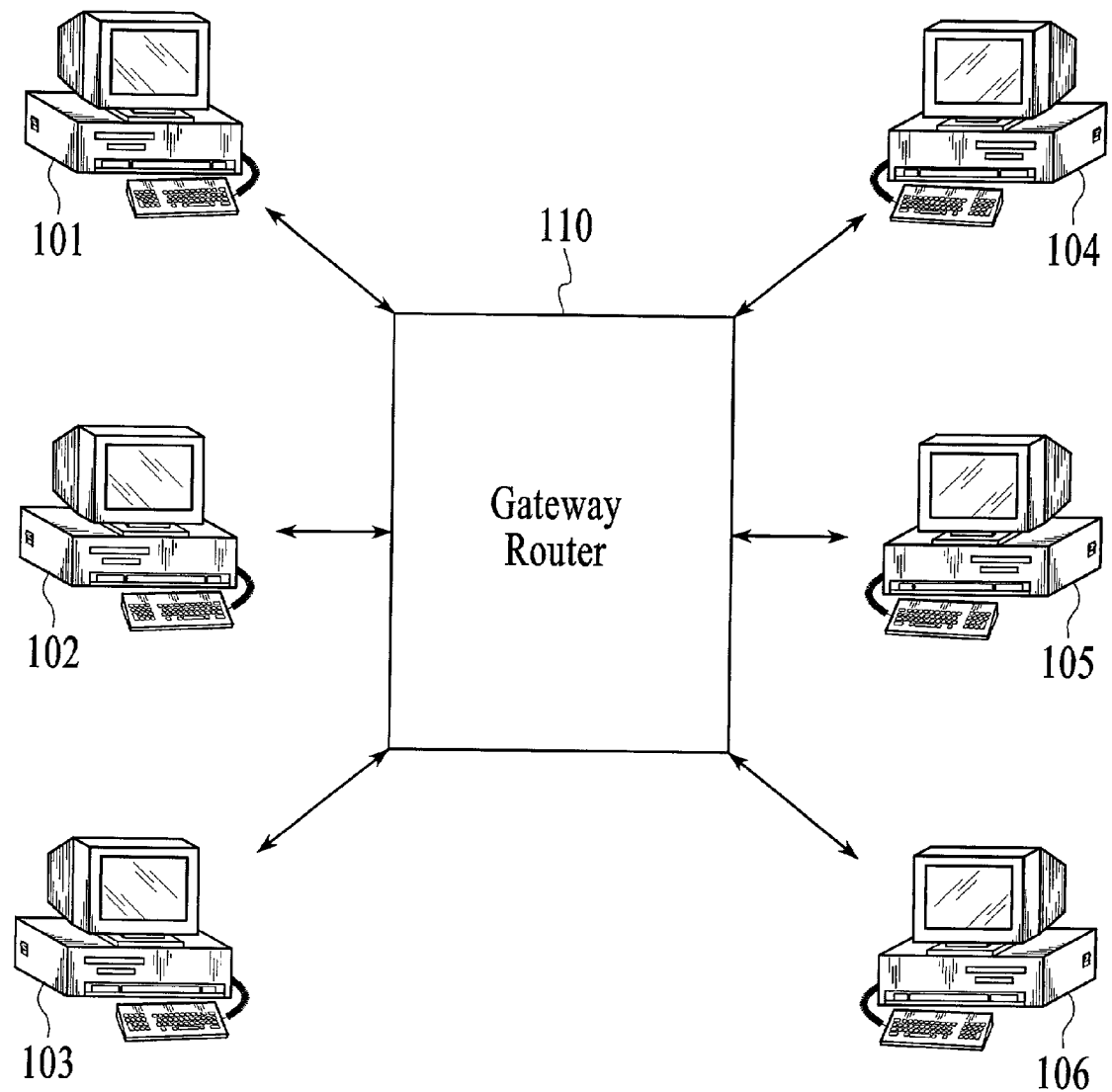
FIG. 1 depicts an example of a packet-switching network.
Figure 2:
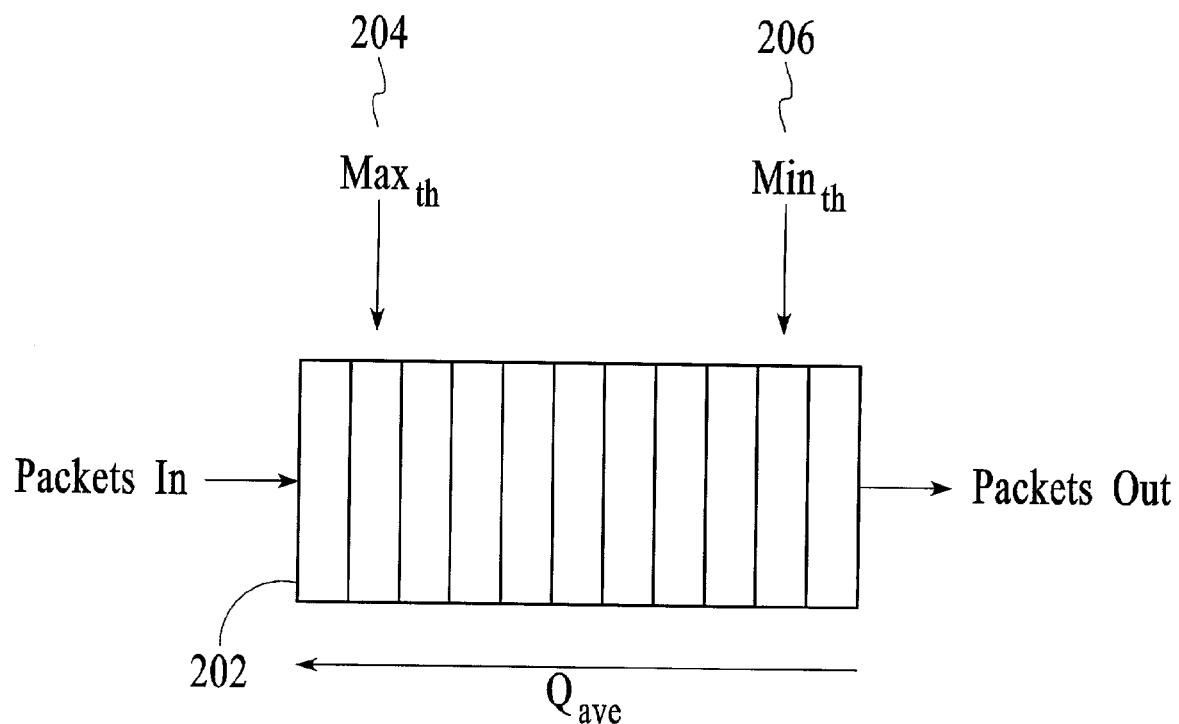
FIG. 2 depicts a conventional gateway queue.
Figure 3:
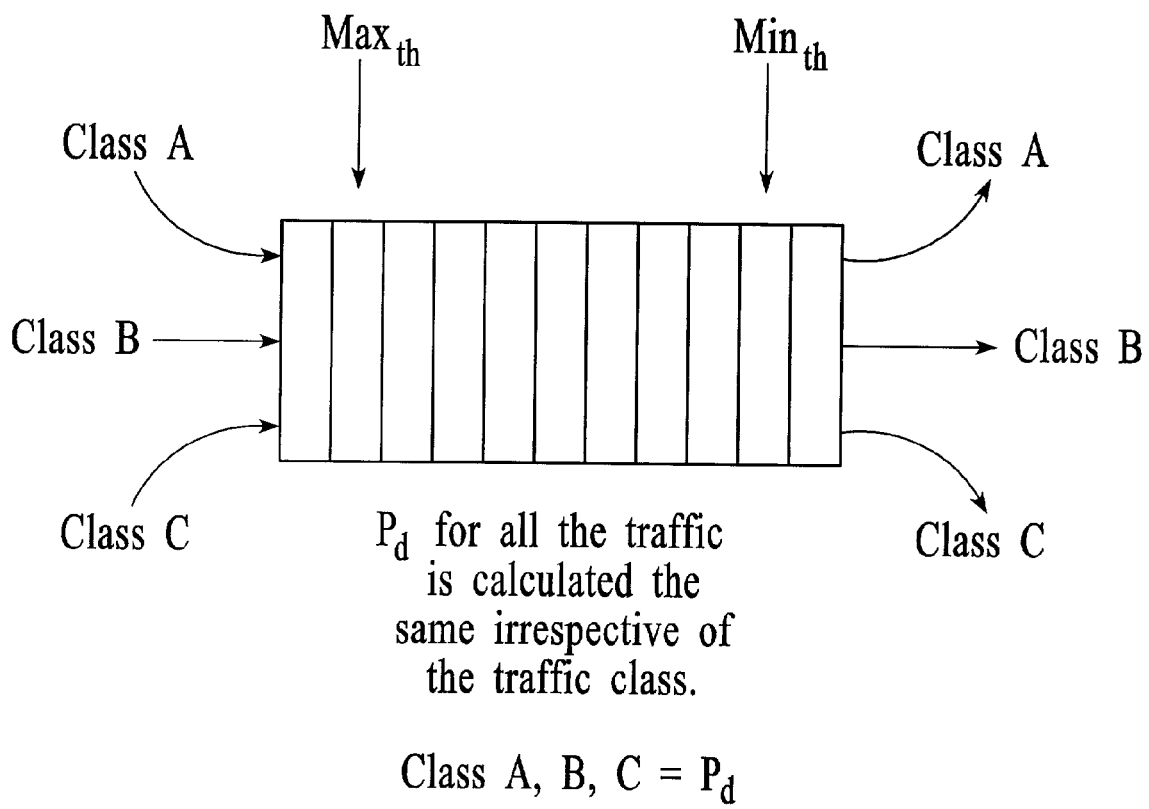
FIG. 3 depicts a gateway queue where different classes of data traffic are being transmitted.
Figure 4:
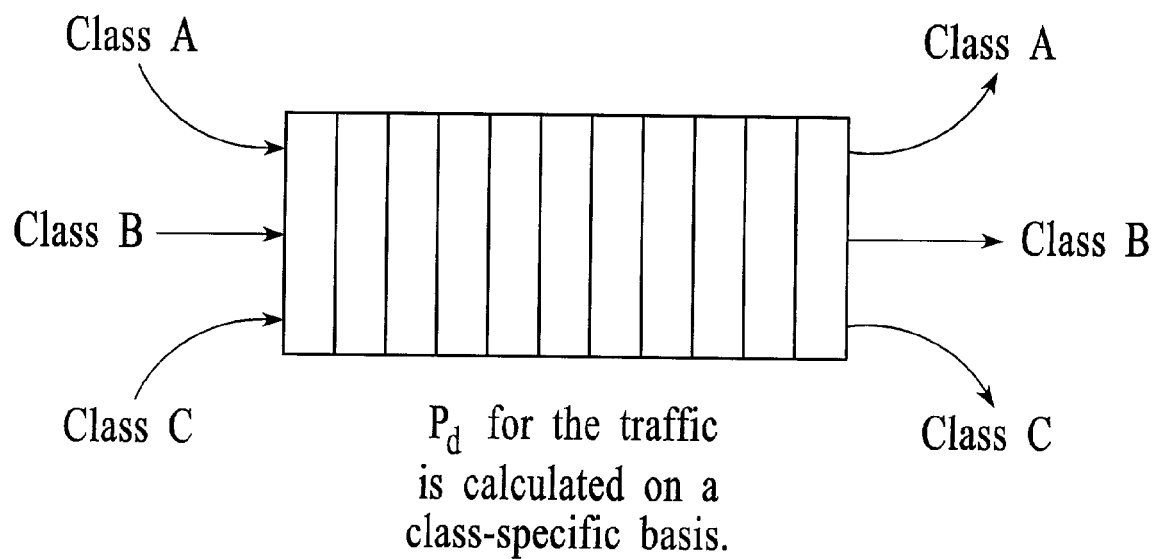
FIG. 4 depicts an illustration of a gateway queue in accordance with the present invention.

FIG. 4 depicts an illustration of a queue 400 in accordance with an embodiment of the invention. Packets of different classes are intended for the same queue 400. Class-specific RED is applied to the packets, that are intended for the same queue, on a class-specific basis (class-specific RED). In an embodiment, class-specific RED involves the calculation of class-specific drop probabilities for each of the different classes of traffic e.g. Class A=$P_{dA}$, Class B=$P_{dB}$, Class C=$P_{dC}$. Once the class-specific drop probabilities are calculated, the decision of whether or not to drop packets is made in response to each packet's associated class-specific drop probability. If a packet is not dropped in response to the application of class-specific RED, it is queued (within the queue 400) for forwarding.

Figure 5:
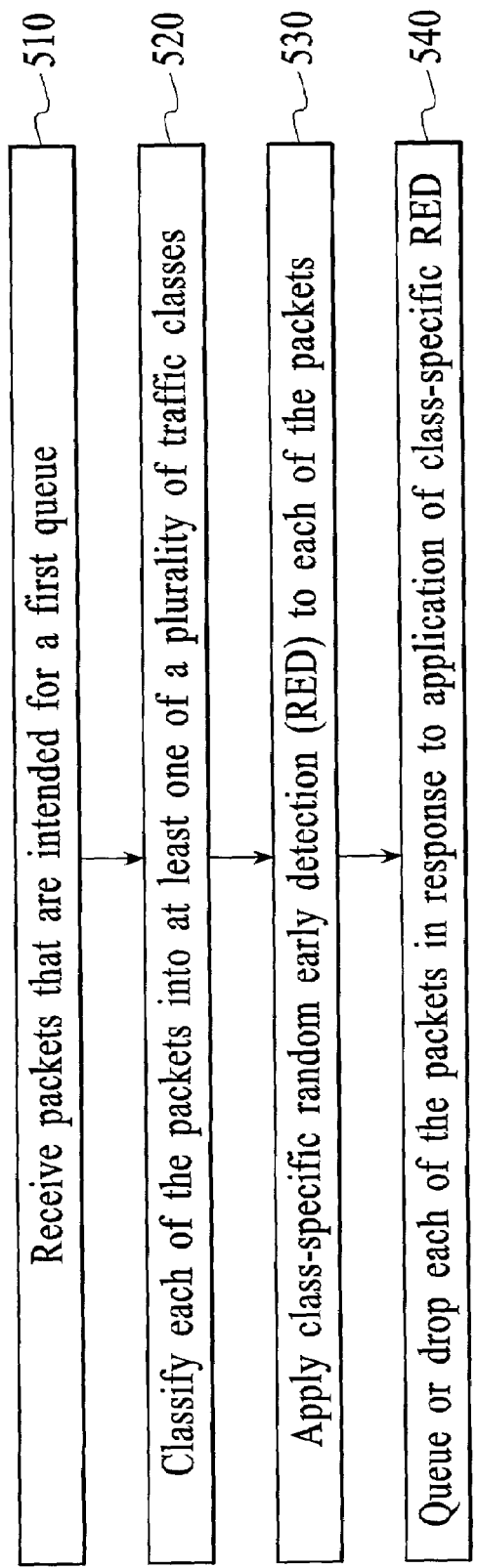
FIG. 5 depicts a high-level flowchart of an embodiment of a method for controlling the flow of traffic within a network node in accordance with an embodiment of the invention.

FIG. 5 depicts a high-level flowchart of a method for controlling the flow of traffic in accordance with an embodiment of the invention. At block 510, packets that are intended for a queue are received. At block 520, each of the packets is classified into at least one of a plurality of traffic classes. At block 530, class-specific RED is applied to each of the packets. In a further embodiment, at block 540, packets are either queued or dropped in response to application of class-specific RED.

Figure 6:
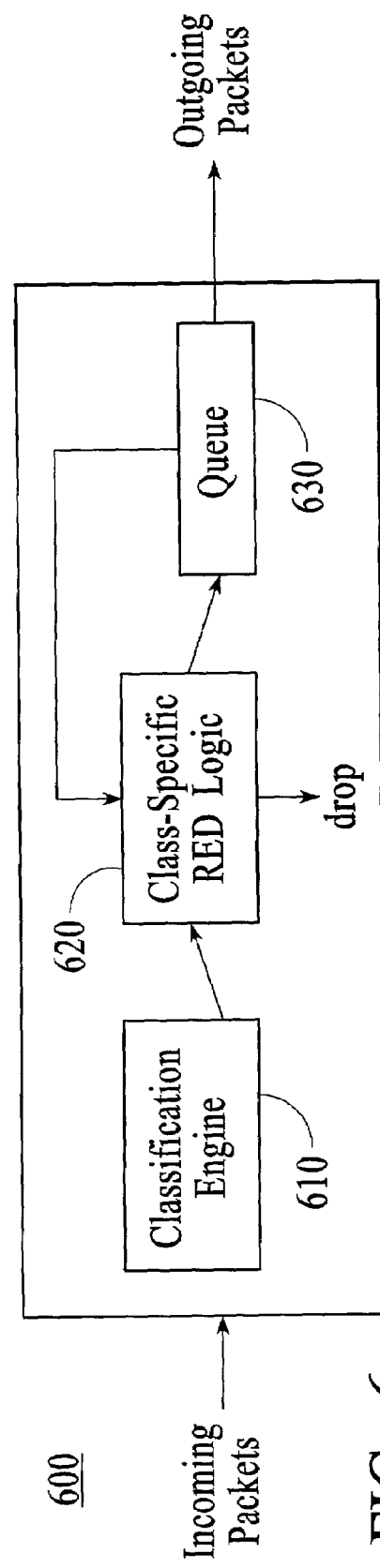
FIG. 6 depicts a system for controlling the flow of traffic within a network node in accordance with an embodiment of the invention.

FIG. 6 depicts an exemplary system 600 for controlling the flow of traffic in accordance with an embodiment of the invention. The system 600 includes a classification engine 610, class-specific RED logic 620, and a queue 630. The classification engine reads header information from incoming packets to determine the traffic class to which each packet belongs. In an embodiment, the classification engine can read information from any of the layer 2 through 7 headers (as defined in the OSI model) of a packet to classify the packet. In an embodiment, the classification engine reads header information from the layer 2, layer 3, and layer 4 headers of a packet to classify the packet into one of the traffic classes. Fields of interest to the classification engine may include input port information, media access control (MAC) source and destination addresses, IP source and destination addresses, layer 4 protocol types (i.e. TCP or UDP), and socket numbers, etc.

The number and types of traffic classes that are established is implementation specific. In the embodiment of FIG. 4, different packet classes, class A, class B and class C, are identified for example purposes. In the embodiment, the three different traffic classes are established for traffic types that have distinct transmission requirements (i.e. bandwidth, latency, latency variation, traffic loss, etc.). The traffic classes may be prioritized relative to each other. For instance, Class A packets could be given a higher priority than Class B packets.

The class-specific RED logic 620 determines whether packets will be placed in the queue 630 or dropped. The class-specific RED logic applies class-specific RED to incoming packets.

Two contemplated embodiments of applying class-specific RED to incoming packets are described below. A first embodiment of applying class-specific RED to incoming packets involves the use of class-specific logical queues and a second embodiment of applying class-specific RED to incoming packets involves the use of class-specific drop probability weights.

Class-Specific Logical Queues

During times of congestion, it is desirable to drop packets of a lower priority, i.e. lower-class packets, before dropping packets of a higher priority, i.e. higher-class packets. One contemplated embodiment of class-specific RED involves establishing a plurality of class-specific logical queues (e.g. lower priority data is stored in a different logical queue than higher priority data) on top of the main queue to which the incoming packets are intended. Preferably, the class-specific queues are established and managed by the class-specific RED logic wherein each of said class-specific logical queues has its own set of RED queue parameters. For example, each of the class-specific logical queues could have an associated maximum drop probability, maximum queue threshold, and minimum queue threshold. Class-specific logical queues give differential treatment to different classes of traffic.

Figure 7:
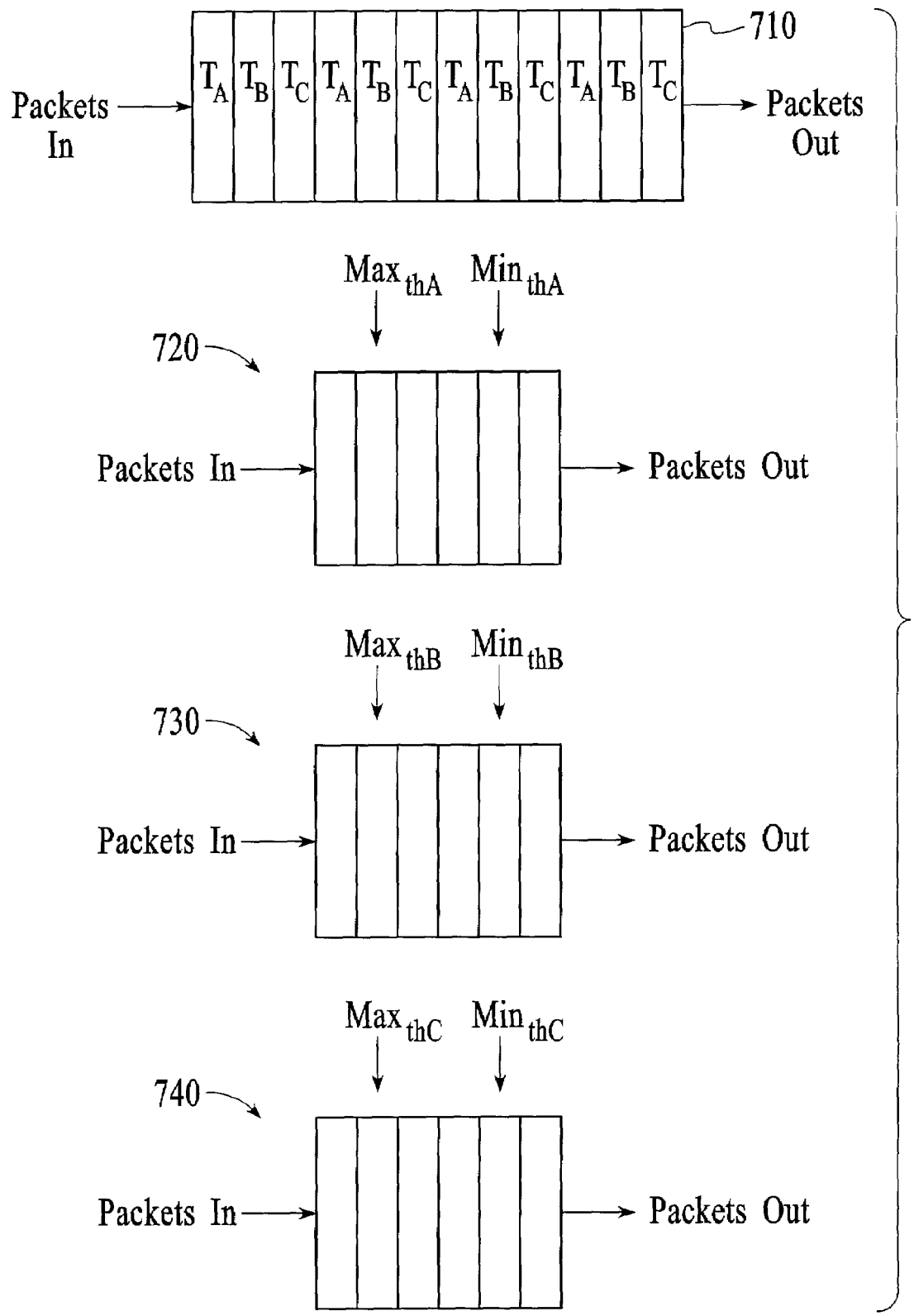
FIG. 7 depicts a plurality of class-specific logical queues for implementing an embodiment of class-specific RED in accordance with an embodiment of the invention.

FIG. 7 depicts a main queue 710 that stores data of different traffic classes e.g. class A=$T_A$, class B=$T_B$ and class C=$T_C$. The main queue 710 is subsequently divided into a plurality of class-specific logical queues i.e. class A queue 720, class B queue 730, and class C queue 740. Each class-specific logical queue 720, 730, 740 accordingly has an associated maximum drop probability, maximum queue threshold, and minimum queue threshold, e.g. $\max_{pA}$, $\max_{thA}$, and $\min_{thA}$ for class A queue 720, $\max_{pB}$, $\max_{thB}$, and $\min_{thB}$ for class B queue 730, etc. In an embodiment, the $\max_{pK}$, $\max_{thK}$, and $\min_{thK}$ (where K identifies the associated class-specific logical queue) for each class-specific logical queue is based on the relative priority of the traffic classes. By establishing different $\max_{pK}$, $\max_{thK}$, and $\min_{thK}$ values for each class-specific logical queue, the packet drop probability, $P_{dK}$, of each individual class-specific logical queue is based on the relative priority of the class. Thus, a higher priority traffic class can be sure to have a lower drop probability than a lower priority class. If an incoming packet is not dropped in response to the application of the class-specific RED logic, it is queued for forwarding. In an embodiment, packets are physically queued in the main queue only and are logically queued in the logical queue. That is, the packets are actually stored in the main queue while the logical queues just track the length of each respective logical queue. For example, when a packet of class A arrives, it is placed into the main queue and the queue length for logical queue A is increased as a function of the packet size. Similarly, when a packet of class B arrives, it is placed into the main queue and the queue length for logical queue B is increased as a function of the packet size. In addition, when a packet of class A leaves the main queue, the queue length for logical queue A is decreased as a function of the packet size.

By way of example, let us assume that a packet's drop probability is calculated based on the following equation:

$$P_{dK}=(Q_{aveK}-\min_{thK})*(\max_{pK}/(\max_{thK}-\min_{thK})$$

where $Q_{aveK}$ is the average queue size of the Kth queue, $\min_{thK}$ is the minimum threshold of the Kth queue, $\max_{pK}$ is the maximum probability to drop for the Kth queue, and $\max_{thK}$ is the maximum threshold of the Kth queue. Accordingly, the drop probability of the Kth queue can be controlled by adjusting the $\max_{pK}$, $\max_{thK}$, and $\min_{thk}$ values of the Kth queue. Since it is desirable to drop packets of a lower priority before dropping packets of a higher priority, the class-specific logical queues of a lower priority are accorded a higher drop probability than the class-specific logical queues of a higher priority.

The class-specific logical queues define the logical space afforded to each traffic class and the logical space afforded each traffic class can be adjusted on a per-class basis. Thus, some traffic classes can be given more logical queue space than other traffic classes. Traffic classes with more logical queue space will be able to buffer more packets in times of instantaneous congestion. For example, the TCP bursts of a particular class will be more readily absorbed as a result of a larger queue space. If the logical queue sizes afforded to the different traffic classes are the same, then the maximum drop probability can be varied to increase or decrease the drop probability of a particular class. In addition, the dropping of packets can be controlled on a per-class basis by adjusting the max$_{thK}$ and min$_{thk}$ values of the class-specific logical queues.

By way of example, if it is desirable that voice traffic be given a higher priority than video traffic, then the max$_{pK}$, max$_{thK}$, and min$_{thK}$ values of the class-specific logical queue assigned to handled the voice traffic and/or the class-specific logical queue assigned to handle the video traffic can be adjusted whereby the P$_{dK}$ value for the voice traffic queue is lower than that of the video traffic queue. Consequently, during times of congestion, the number of voice data packet drops will likely be lower than the number of video data drops. Stated alternatively, video data packets are likely to be dropped before voice data packets. In an embodiment, max$_{thK}$ and min$_{thK}$ are set based on the type of traffic that is coming into the respective class-specific logical queues. In the above example, the class-specific logical queue for voice traffic can be larger than the class-specific logical queue for video traffic. Making a class-specific logical queue for voice traffic larger than a class-specific logical queue for video traffic is desirable because voice traffic tends to be more bursty than video traffic.

FIG. 8 is a flowchart of a first embodiment of a method for controlling the flow of traffic in a network node in accordance with the present invention. At block 810, a plurality of class-specific logical queues is established. In an embodiment, the class-specific logical queues are established and managed by the class-specific RED logic. At block 820, maximum and minimum thresholds and a maximum drop probability are established for each of said plurality of class-specific logical queues. At block 830, the maximum and minimum thresholds and the maximum drop probability for each of said plurality of class-specific logical queues are utilized in applying RED. Again, since the drop probability is a function of the the maximum and minimum thresholds and the maximum drop probability of a queue, the maximum and minimum thresholds and the maximum drop probability for each of the plurality of class-specific logical queues can be adjusted so that packets of a lower priority are dropped before packets of a higher priority during times of congestion. If a packet is not dropped by a class-specific logical queue in response to the application of the class-specific RED logic, it is queued for forwarding.

Class-specific Drop Probability Weights

Another contemplated embodiment for applying class-specific RED involves the utilization of class-specific drop probability weights in the calculation of the drop probability. In this embodiment, the class-specific RED logic establishes and manages a table of class-specific drop probability weights for a plurality of different traffic classes. This table is accessed by the class-specific RED logic and the class-specific drop probability weights are utilized to calculate class-specific drop probabilities for the classified packets.

Again by way of example, let us assume that a packet's drop probability is calculated based on the following equation:

$$P_d = (Q_{ave} - min_{th}) * (max_p / (max_{th} - min_{th}))$$

where P$_d$ is the drop probability for each incoming packet that is intended for a particular queue. Since it is desirable to drop packets of a lower priority before dropping packets of a higher priority, during times of congestion, a class-specific drop probability weight can be utilized based on the following relationship to adjust P$_d$ for data packets so that packets of a lower priority are most likely dropped before packets of a higher priority during times of congestion:

$$P_{dK} = P_d(wt_K)$$

where wt$_K$ is the drop probability weight for the Kth class of data.

Accordingly, for a higher priority class of data, the associated P$_d$ value should be lower than the associated P$_d$ value of a lower priority class of data, thereby decreasing the likelihood that a high priority data packet will be dropped before a low priority data packet during periods of queue congestion. FIG. 9 depicts a class-specific drop-probability-weight table 900 wherein each of the different traffic classes of data (class A, class B, class C) is assigned specific drop probability weight (wt$_A$, wt$_B$, wt$_C$). In an embodiment, the class-specific drop-probability-weight table is stored in hardware although it could be stored in another way, for example, software and/or RAM etc.

In accordance with an embodiment of the invention, for a higher priority class of traffic, a lower drop probability weight is assigned, thereby decreasing the associated P$_d$ value of a data packet of that traffic class. Conversely, for a lower priority traffic class, a higher drop probability weight is assigned, thereby increasing the associated P$_d$ value of a data packet of that traffic class. Accordingly, packets of lower priority traffic class data packets will likely be dropped before higher priority traffic class data packets during times of queue congestion.

By way of example, assume that voice data is of a higher priority than video data (i.e., class A and class B). Once a data packet is classified as a voice data packet, a lower drop probability weight is utilized to calculate the associated P$_d$ value, thereby resulting in a lower associated P$_d$ value for the voice data packet. Similarly, once a data packet is classified as a video data packet, a higher drop probability weight is utilized to calculate the associated P$_d$ value, thereby resulting in a higher associated P$_d$ value for the video data packet. By applying class-specific RED to the particular queue, during times of queue congestion, the number of voice data packet drops will likely be lower than the number of video data drops. Alternatively stated, video data packets are more likely to be dropped before voice data packets.

Figure 10:
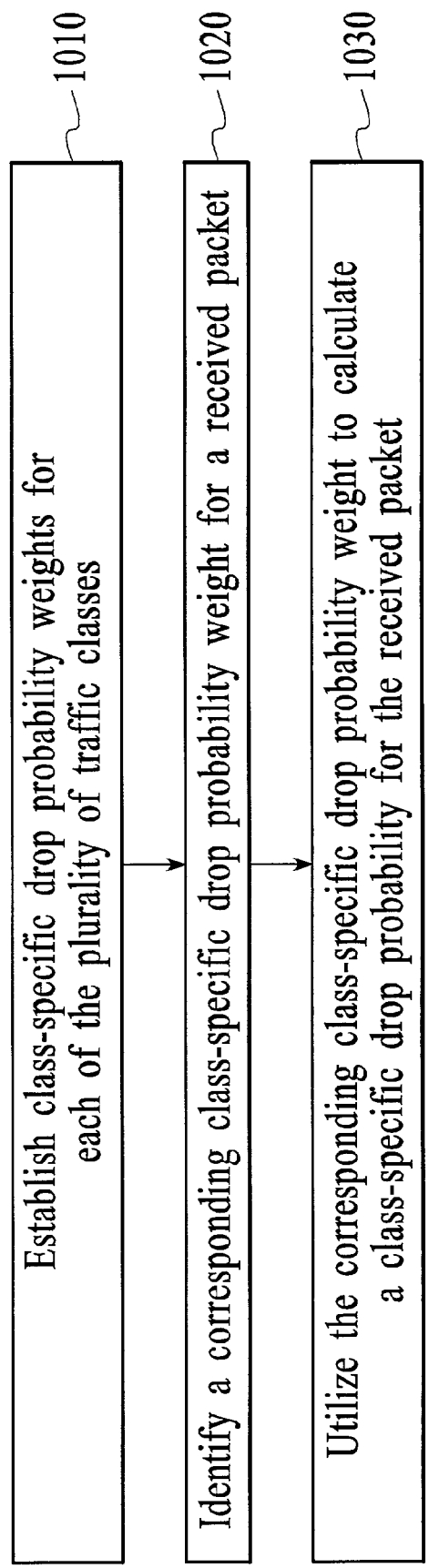
FIG. 10 is a flowchart of another embodiment of the method for controlling the flow of traffic within a network node in accordance with an embodiment of the invention.

FIG. 10 is a flowchart of a second embodiment of the method in accordance with the present invention. First, class-specific drop probability weights are established for a plurality of different traffic classes, via step 1010. Next, a corresponding class-specific drop probability weight is identified for a received packet, via step 1020. Finally, the corresponding class-specific drop probability weight is utilized to calculate a class-specific drop probability for said one received packet, via step 1030. In the system implementation of FIG. 6, the steps 1010-1030 are carried out by the class-specific RED logic.

In an embodiment, the class-specific RED techniques are implemented in a router, however the class-specific RED techniques could be implemented in any device that queues traffic, such as a switch. In addition, although class-specific RED is implemented with respect to a single queue (i.e., a first queue), class-specific RED can be implemented as described above on multiple queues. That is, class-specific RED can be implemented in distinct instances for each separate queue of the multiple queues.

Although the above-described embodiments are discussed in the context of voice and video data traffic, one of ordinary skill in the art will readily recognize that a variety of different traffic classes of data could be incorporated in any embodiment of the invention while remaining within the spirit and scope of the present invention. In addition, although the above-described embodiments are described with reference to a TCP/IP environment, class-specific RED can be applied to network environments other than TCP/IP.

A method in accordance with the present invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for controlling the flow of packets within a network node.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

While the invention is described in the general context of an application program that runs on an operating system in conjunction with a computer system and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling the flow of packets within a network node comprising:
    receiving packets that are intended for a main queue;
    classifying each of said packets into at least one of a plurality of traffic classes, wherein the main queue is utilized to physically queue the plurality of traffic classes;
    tracking lengths of a plurality of class-specific logical queues within the main queue, each of the class-specific logical queues corresponding to one of the traffic classes;
    applying class-specific random early detection (RED) to each of said packets, wherein the class-specific RED is based at least in part on distinct transmission requirements of each of the plurality of traffic classes and the lengths of the class-specific logical queues; wherein applying class-specific RED further comprises: establishing the plurality of class-specific logical queues establishing queue-specific minimum and maximum thresholds and a maximum drop probability for each of said class-specific logical queues; and utilizing said queue-specific minimum and maximum thresholds and said maximum drop probability that are established for said class-specific logical queues in applying class-specific RED.

2. The method of claim 1 wherein applying class-specific RED includes calculating class-specific drop probabilities for said packets.

3. The method of claim 2 wherein applying class-specific RED includes determining whether or not to drop packets in response to each packet's associated class-specific drop probability.

4. The method of claim 3 further comprising queuing, in said main queue, packets that are not dropped in response to application of said class-specific RED.

5. The method of claim 4 wherein said packets are formatted according to the Transmission Control Protocol (TCP).

6. The method of claim 1 further comprising queuing, in said main queue, packets that are not dropped in response to application of said class-specific RED.

7. The method of claim 1 further comprising queuing, in said class-specific logical queues, packets that are not dropped in response to application of said class-specific RED.

8. The method of claim 1 wherein applying class-specific RED further comprises establishing class-specific drop probability weights for each of said plurality of traffic classes.

9. The method of claim 8 wherein applying class-specific RED further comprises:
    identifying a corresponding class-specific drop probability weight for one of said received packets; and
    utilizing said corresponding class-specific drop probability weight to calculate a class specific drop probability for said one received packet.

10. The method of claim 9 wherein said class-specific drop probability weights represent the relative priorities of said traffic classes.

11. The method of claim 10 wherein a traffic class having a high relative priority has a lower class-specific drop probability weight than a traffic class having a low relative priority.

12. A system for controlling the flow of packets within a network node comprising:
    a classification engine configured to classify packets into at least one of a plurality of traffic classes;

class-specific random early detection (RED) logic configured to apply class-specific RED to each of said packets that have been classified by said classification engine;

a main queue for physically queuing any of said packets that are not dropped in response to application of said class-specific RED, wherein the main queue is utilized to queue the plurality of traffic classes;

a plurality of class-specific logical queues to track lengths corresponding to packets of each of the traffic classes in the main queue, wherein the class-specific RED is based at least in part on distinct transmission requirements of each of the plurality of traffic classes and the lengths of the class-specific logical queues; wherein applying class-specific RED further comprises: establishing the plurality of class-specific logical queues establishing queue-specific minimum and maximum thresholds and a maximum drop probability for each of said class-specific logical queues; and utilizing said queue-specific minimum and maximum thresholds and said maximum drop probability that are established for said class-specific logical queues in applying class-specific RED.

13. The system of claim 12 wherein said class-specific RED logic includes logic for calculating class-specific drop probabilities for said packets.

14. The system of claim 13 wherein said class-specific RED logic includes logic for determining whether or not to drop packets in response to each packet's associated class-specific drop probability.

15. The system of claim 14 wherein packets that are not dropped in response to application of said class-specific RED are queued in said main queue.

16. The system of claim 15 wherein said packets are formatted according to the Transmission Control Protocol (TCP).

17. The system of claim 12 wherein packets that are not dropped in response to application of said class-specific RED are queued in said main queue.

18. The system of claim 17 wherein packets that are not dropped in response to application of said class-specific RED are queued in said class-specific logical queues.

19. The system of claim 12 wherein said class-specific RED logic includes logic for maintaining class-specific drop probability weights for each of said plurality of traffic classes.

20. The system of claim 19 wherein said class-specific RED logic includes logic for:
identifying a corresponding class-specific drop probability weight for one of said received packets; and
utilizing said corresponding class-specific drop probability weight to calculate a class specific drop probability for said one received packet.

21. The system of claim 20 wherein said class-specific drop probability weights represent the relative priorities of said traffic classes.

22. The system of claim 21 wherein a traffic class having a high relative priority has a lower class-specific drop probability weight than a traffic class having a low relative priority.

23. A computer readable storage medium containing program instructions for controlling the flow of packets within a network node, the program instructions comprising:
receiving packets that are intended for a main queue;
classifying each of said packets into at least one of a plurality of traffic classes, wherein the main queue is utilized to physically queue the plurality of traffic classes;
tracking lengths of a plurality of class-specific logical queues within the main queue, each of the class-specific logical queues corresponding to one of the traffic classes;
applying class-specific random early detection (RED) to each of said packets, wherein the class-specific RED is based at least in part on distinct transmission requirements of each of the plurality of traffic classes and the lengths of the class-specific logical queues; wherein applying class-specific RED further comprises: establishing the plurality of class-specific logical queues establishing queue-specific minimum and maximum thresholds and a maximum drop probability for each of said class-specific logical queues; and utilizing said queue-specific minimum and maximum thresholds and said maximum drop probability that are established for said class-specific logical queues in applying class-specific RED.

24. The computer readable storage medium of claim 23 wherein applying class-specific RED further comprises establishing class-specific drop probability weights for each of said plurality of traffic classes.

25. The computer readable storage medium of claim 24 wherein applying class-specific RED further comprises:
identifying a corresponding class-specific drop probability weight for one of said received packets; and
utilizing said corresponding class-specific drop probability weight to calculate a class specific drop probability for said one received packet.

26. The computer readable storage medium of claim 25 wherein said class-specific drop probability weights represent the relative priorities of said traffic classes.

* * * * *